United States Patent
Bui et al.

(10) Patent No.: US 7,681,364 B2
(45) Date of Patent: Mar. 23, 2010

(54) DECORATED TWO COMPONENT WINDOW ASSEMBLY AND METHOD OF MANUFACTURE

(75) Inventors: Bein T. Bui, Howell, MI (US); Thomas V. Cutcher, Petersburg, MI (US); Eric F. J. M. van der Meulen, Wixom, MI (US); Chengtao Li, Novi, MI (US)

(73) Assignee: Exatec, LLC, Wixom, MI (US)

( * ) Notice: Subject to any disclaimer, the term of this patent is extended or adjusted under 35 U.S.C. 154(b) by 749 days.

(21) Appl. No.: 11/362,489

(22) Filed: Feb. 24, 2006

(65) Prior Publication Data

US 2006/0210772 A1  Sep. 21, 2006

Related U.S. Application Data

(60) Provisional application No. 60/655,810, filed on Feb. 24, 2005.

(51) Int. Cl.
*E06B 3/20* (2006.01)

(52) U.S. Cl. .............................. 52/204.53; 296/146.15; 156/108

(58) Field of Classification Search .............. 52/204.53, 52/459, 211, 208; 296/146.15; 156/108
See application file for complete search history.

(56) References Cited

U.S. PATENT DOCUMENTS

| | | | | |
|---|---|---|---|---|
| 3,282,014 A | * | 11/1966 | Bamford | 52/800.14 |
| 3,432,376 A | | 3/1969 | Reed et al. | |
| 3,981,113 A | * | 9/1976 | Griffin | 52/208 |
| 4,571,278 A | * | 2/1986 | Kunert | 156/108 |
| 4,953,907 A | * | 9/1990 | Sugita | 296/93 |
| 5,001,876 A | * | 3/1991 | Harper et al. | 52/208 |
| 5,042,871 A | | 8/1991 | Gotanda et al. | |
| 5,073,423 A | | 12/1991 | Johnson et al. | |
| 5,197,243 A | | 3/1993 | Mozawa et al. | |
| 5,339,584 A | | 8/1994 | Ohtake et al. | |
| 5,915,780 A | * | 6/1999 | Kobrehel et al. | 296/146.15 |
| 6,307,185 B1 | * | 10/2001 | Loveless | 219/400 |
| 6,309,755 B1 | | 10/2001 | Matsco et al. | |
| 6,382,696 B1 | * | 5/2002 | Young | 296/93 |
| 6,460,300 B2 | * | 10/2002 | Mikkaichi et al. | 52/204.597 |
| 6,643,984 B2 | * | 11/2003 | Kato et al. | 52/204.53 |
| 6,748,706 B2 | * | 6/2004 | Gaiser et al. | 52/208 |

(Continued)

FOREIGN PATENT DOCUMENTS

DE        2829961        3/1980

(Continued)

*Primary Examiner*—Richard E Chilcot, Jr.
*Assistant Examiner*—Alp Akbasli
(74) *Attorney, Agent, or Firm*—Brinks Hofer Gilson & Lione

(57) ABSTRACT

A plastic window assembly includes a substantially transparent plastic panel and an opaque plastic frame adhered to the perimeter of the panel, which bounds and defines an effective viewing area of the panel. A transition step of the frame extends upward from the surface of the panel to a raised surface of the frame. Provided on the surface in the effective viewing area of the panel is an image. In order to print the image such that the outer edges of the image extend to an interfacial area defined by the juncture of the transition step and the second surface of the panel, a MIT printing process and specialized membrane construction is used.

13 Claims, 7 Drawing Sheets

U.S. PATENT DOCUMENTS

| | | |
|---|---|---|
| 6,764,638 B1 | 7/2004 | Matsco et al. |
| 6,776,100 B2 | 8/2004 | Cutcher |
| 6,832,457 B2 * | 12/2004 | Geiger ..................... 52/656.5 |
| 6,964,226 B2 | 11/2005 | Weiss et al. |
| 2006/0156632 A1 * | 7/2006 | Ruppert et al. ................ 49/502 |

FOREIGN PATENT DOCUMENTS

| | | |
|---|---|---|
| DE | 19905098 | 8/2000 |
| JP | 1242298 | 9/1989 |

* cited by examiner

DECORATED TWO COMPONENT WINDOW ASSEMBLY AND METHOD OF MANUFACTURE

CROSS REFERENCE TO RELATED APPLICATION

This application claims the benefit of U.S. Provisional application No. 60/655,810 filed Feb. 24, 2005.

BACKGROUND OF THE INVENTION

1. Field of the Invention

The present invention generally relates to glazing panels and to such panels utilized in automotive applications. More particularly, the present invention relates to the transferring of an image onto a glazing panel having a raised portion about the perimeter of the glazing panel and adjacent thereto.

2. Description of Known Technology

Plastic materials are being used in a number of automotive engineering applications to enhance vehicle styling. For example, polycarbonate is currently used in the manufacturing of B-pillar covers, headlamps, and sunroofs. An emerging application for transparent plastic materials is automotive glazing panel applications, such as windows and panoramic roof systems. When plastics are used to manufacture automotive windows and panoramic roof systems, it is a manufacturing requirement that such windows maintain a certain degree of rigidity. The perimeter of a window often must be reinforced or supported in order to enhance the rigidity of the installed window or roof system. Additionally, it is also a manufacturing requirement that plastic windows and panoramic roof systems are coated to make them scratch resistant.

One method of reinforcing the perimeter of a plastic window or roof system is to injection mold the window in a two shot process. This particular type of injection molding is known as two-component molding. More specifically, the transparent portion of the plastic panel is typically formed in the introduction of a transparent resin ($1^{st}$ shot) into a mold. A second shot is subsequently introduced into a mold, usually around the perimeter of the plastic panel formed by the first shot. This second shot can be formed so as to integrate various types of functionality into the plastic panel, such as ribs, placement fixtures, etc. This second shot, which can be of the same or different resin, transparent or opaque, and of the same or different stiffness, must adhere to the plastic panel made by the first shot through melt bonding with the plastic panel. U.S. Pat. No. 6,764,638 discloses a two shot method and is herein incorporated by reference. This second shot, however, produces a raised frame portion around the perimeter of the transparent panel.

Issues that must be addressed if two component molding is used to produce glazing panels, plastic windows, roof systems or similar systems (herein just referred to as "plastic windows") is the ability to effectively apply any border image, decoration or logo information to the transparent portion of the molded plastic panel. Sometimes, such border images are used to hide or mask aesthetic defects or mounting structures of the window assembly. One form of an aesthetic defect is the formation of a distortion line on the plastic panel. This distortion line typically runs parallel to the edge that the second shot makes with the first shot. This aesthetic defect is described as "picture framing" or "window effect", depending upon the root cause of the defect. The root cause of the "picture framing" is the application of a protective coating, while the "window effect" arises from the molding process itself.

A known problem with printing on plastic panels is that such panels often have complex shapes (concave, convex, compound curvature, etc.) as a direct result of the molding capabilities of the plastic. Screen printing is a known commercial process but is limited by the complexity of the shape of the surface to be printed upon. To utilize screen printing for surfaces other than "flat" substrates, various modified processes must be employed. One such process is a technique known as in mold decoration (IMD). In this technique the printed image is applied via screen printing to a "flat" film. The film is then held either by a vacuum to the surface contour of the mold or is itself formed so as to conform to the surface of the mold. Upon injection of the plastic material into the mold, the film becomes part of the surface of the molded article. Another printing technique is known as membrane image transfer (MIT) printing. A membrane is located in a print station where an image is printed onto the membrane by screen printing or a similar process. The printed membrane is then moved to a transfer station. In the transfer station a substrate fixture holds the substrate and a forming fixture shapes the membrane and moves the membrane into contact with the substrate. Pressure is applied to this fixture combination to effect a transferring of the image from the membrane to the substrate. Once the image is transferred to the substrate, the pressure is released. U.S. Pat. No. 6,776,100 and U.S. Pat. No. 6,964,226 each disclose various aspects of MIT printing and are herein incorporated by reference.

While IMD and MIT printing can be used to transfer an image to a complex shape, these processes are limited in their ability to transfer the image to an area adjacent and precisely aligned with a step height change along the surface of the window assembly. The above mentioned processes are limited by their inability to have the membrane conform to the step height change along the surface of the window assembly.

As seen from the above, there is a need for a system, method and article that overcomes the limitations and drawbacks of the known technology.

SUMMARY

In overcoming the drawbacks and limitations of the known technology, the present invention provides a plastic window assembly comprising: a substantially transparent plastic panel, the panel having opposing first and second surfaces and a perimeter region extending around the panel; a frame provided around the panel, the frame being formed of plastic and adhered to the second surface at the perimeter region of the panel so as to define an effective viewing area of the panel located within the frame, the frame further having portions defining a raised surface and a transition step extending upward from the second surface of the panel to the raised surface of the frame; an interfacial area being defined about a juncture of the transition step and a plane defined by the second surface of the panel; and a decorative image provided on the second surface in the effective viewing area of the panel, the image being non-transparent and having an outer border positioned immediately adjacent to the interfacial area.

In one aspect, the transitional step of the plastic window assembly of defines an angle in the range of about 30 to 60 degrees. More preferably, the transition step defines an angle of about 45 degrees.

While the image may be a variety of images, such a logo, in one preferred construction the image is a fade-out border. The image is preferably non-transparent, but could also be opaque or translucent.

With regard to the frame, it is also preferred that the frame be non-transparent, and more preferably opaque or translucent.

Regarding materials of construction, it is preferred that the frame and the panel are both formed of polycarbonate or other suitable materials.

In one embodiment, the frame is constructed with a lip located in the interfacial area and defining a surface co-planar with the second surface. With this construction the outer border of the image can be located on the lip of the frame.

In another aspect, the present invention provides a method of making a two component window assembly. The method includes the steps of: molding a window sub-assembly, including the steps of, as a first shot, injection molding a substantially transparent panel having opposing first and second surfaces and, as a second shot, injection molding a frame about a perimeter of the panel so as to define an effective viewing area of the panel located having an interfacial border bounded by the frame and to define a transition step extending from the second surface to a raised surface of the frame; providing a membrane having an image transfer surface, the membrane including a deformation relief formed therein; printing a decorative image onto the image transfer surface of the membrane; registering the membrane and image relative to the window sub-assembly; shaping the membrane to correspond with the contour of the window sub-assembly wherein the deformation relief allows a region of the membrane bounded by the deformation relief to more readily deform than remaining portions of the membrane; and transferring the image from the membrane to the window sub-assembly panel.

In another aspect of the invention, the image transfer surface is provided at an elevated height relative to the remainder of the membrane.

In providing the membrane, the relief may be formed with a shape generally corresponding to the interfacial border area of the effective viewing area of the panel.

In printing the decorative image, the outer border of the image may be printed so as to corresponding to the shape of the interfacial border. Further, it is preferred that the image is positioned such that its outer border is immediately adjacent to the interfacial border of the window sub-assembly, on the second surface of the panel or, alternatively, on the transition step.

In transferring the decorative image, pressure may be applied between the membrane and the window sub-assembly.

In shaping the membrane, as a result of the deformation relief being formed in the membrane, the image transfer surface may be shaped to a different degree than areas of the membrane surrounding the image transfer surface.

In an alternative embodiment, the step of molding a window sub-assembly includes the step of forming a lip of the frame co-planar with the second surface of the panel. This construction allows the step of transferring the decorative image to position the outer border of the image on the lip of the frame.

As a further alternative, forming of the membrane may include the steps of providing an image transfer pad on a carrier sheet, wherein the image transfer pad defines an elevated image transfer surface relative to surface of the carrier sheet. In securing the pad to the carrier sheet, the pad may be adhesively secured, sewn or otherwise fixedly positioned on the carrier sheet.

In another aspect, the present invention provides a membrane for use in a membrane image transfer printing process. The membrane includes a body defining a membrane image transfer surface. Formed in the body and bounding the image transfer surface is a deformation relief.

The body may alternatively be in the form of sheet member and the deformation relief may be a recessed groove or similar structure allowing the image transfer surface to be shaped to a different degree than the surrounding area. Preferably, the deformation relief is formed in the sheet structure and provided as a closed loop structure.

In one alternative construction, the relief is formed in the surface defining the image transfer surface. In a further alternative construction, the relief is formed in a surface of the body opposite from the image transfer surface.

In another alternate embodiment, the body is supported by a carrier sheet. As such, the body may be formed as a transfer pad secured to the carrier sheet, either by adhesives, stitching/sewing, or similar means of fixing the pad to the sheet. In such a construction, the transfer pad defines the image transfer surface as an elevated surface relative to a surface of the carrier sheet.

DETAILED DESCRIPTION OF THE INVENTION

Figure 1:
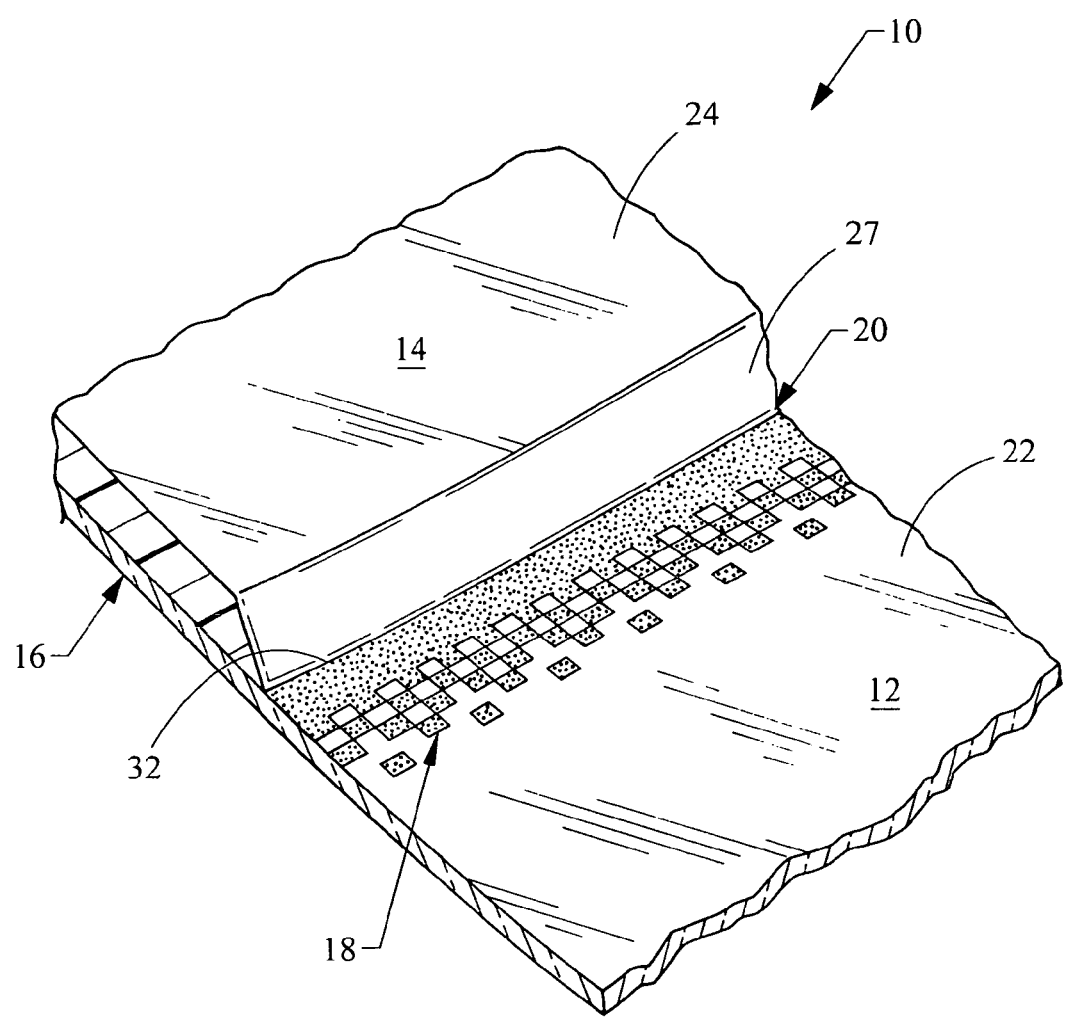
FIG. 1 is a partial view through a section of a window assembly embodying the principles of the present invention.

In overcoming the limitations and drawbacks of the known technology, the present invention provides a way to apply logo information and/or a decorative border, such as a dotted fade-out or black-out patterns, onto a window assembly 10, and in particular on a transparent panel 12 immediately adjacent to the inside perimeter defined by a frame portion 14 of a two component window assembly 10. In addition, the present invention provides various means to eliminate, reduce and mask common aesthetic defects known as "picture framing", which occurs upon the application and pooling of a protective coating, and the "window effect", which arises from the molding process itself and may include distortion lines and sink marks.

The window assembly 10 is a two component window assembly and, as such, includes a transparent panel 12 (typically the first shot of the molding process) and an opaque frame portion 14 (typically the second shot of the molding process) that extends fully or partially about a perimeter region 16 of the transparent panel 12.

The transparent panel 12 itself may be constructed of any thermoplastic polymeric resin or a mixture or combination thereof. Appropriate thermoplastic resins include, but are not limited to, polycarbonate resins, PMMA, acrylic resins, polyarylate resins, polyester resins, and polysulfone resins, as well as copolymers and mixtures thereof. The panel 12 is preferably formed via injection molding, but any of the various known techniques, such as other molding techniques, thermoforming, or extrusion, could be employed.

The frame portion 14 may also be constructed of any thermoplastic polymeric resin or a mixture or combination thereof suitable for injection molding. Appropriate thermoplastic resins would include all of the same materials appropriate for the panel 12, as well as polycarbonate blends (PC/ABS, PC/ASA, PC/PBT, PC/PET). While it is preferred that the frame portion 14 is opaque, it could be translucent or transparent if desired.

In its final construction, the plastic panel 12 may be protected from such natural occurrences as exposure to ultraviolet radiation, oxidation, and abrasion through the providing of one or more protective layers, both on the exterior side and/or interior side of the panel 12. The protective layers may be of any know variety or material suitable for that purpose. As the term is used herein, a transparent plastic panel 12 with at least one protective layer is defined as a transparent plastic glazing panel. The protective coatings may be applied as protective layers by any suitable technique known to those skilled in the art.

The molding process itself may introduce some aesthetic defects into the window assembly 10, particularly in the area of the juncture of the first and second shots. Additionally, the second shot may integrally form mounting structures (not shown) to secure the window assembly 10 in place in a vehicle. An image 18, herein illustrated as a fade-out border, is used to mask and hide these imperfections and structures and to provide an aesthetically pleasing transition from the transparent nature of the panel 12 to the opaqueness of the frame portion 14. The step height 21 at the interfacial area 20 between the surface 22 of the transparent panel 12 and the surface 24 of the frame portion 14 is critical to the successful printing of an image 18 using a MIT process. The angle associated with this step height 21 needs to be conducive to allowing a membrane 26 to conform to the interfacial area 20 in applying the image 18.

Figure 2A:
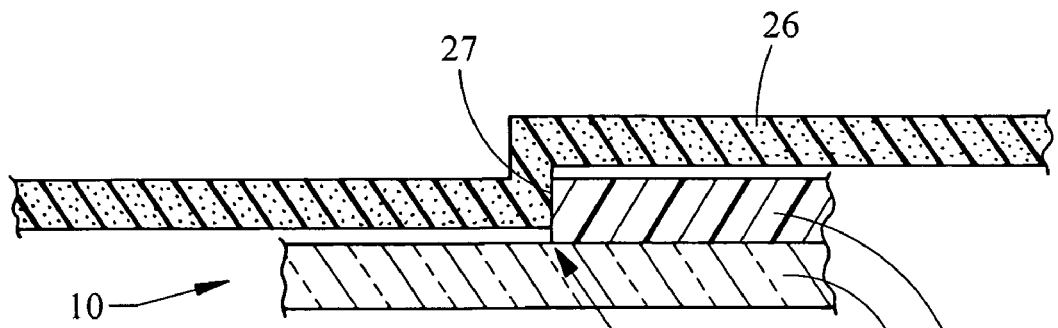
FIGS. 2A-2D are partial cross-sectional illustrations illustrating the inner facial area or step height of a two component window assembly and a membrane located relative thereto.

Several examples of various geometries for the step height 21 between the first shot (the transparent panel 12) and the second shot (the frame portion 14) are shown in FIGS. 2A-2D, with a membrane 26 generally laid over the top thereof. FIG. 2A illustrates the step height 21 having a perpendicular step profile 27 that is not conducive to shaping a membrane so as to conform thereto. As a result, it would be extremely difficult to print an image 18 immediately adjacent to the interfacial area 20 in such a design.

Figure 2B:
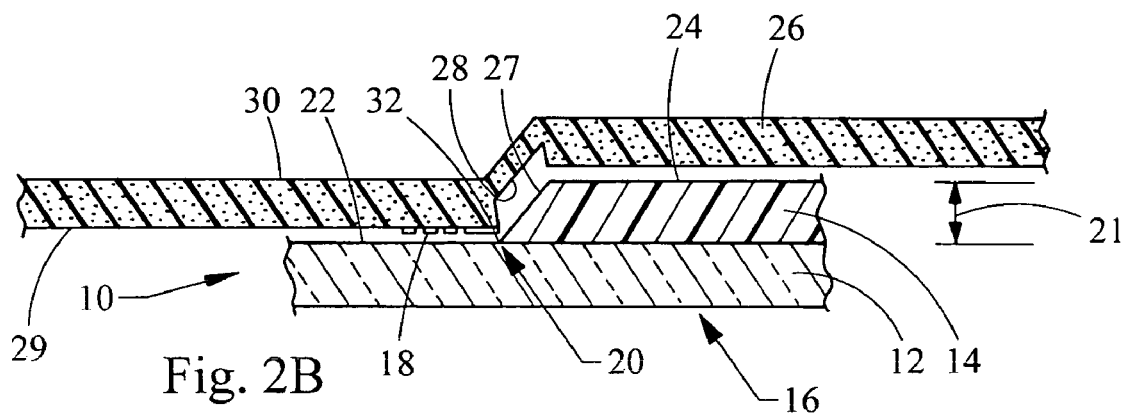
Figure 2C:
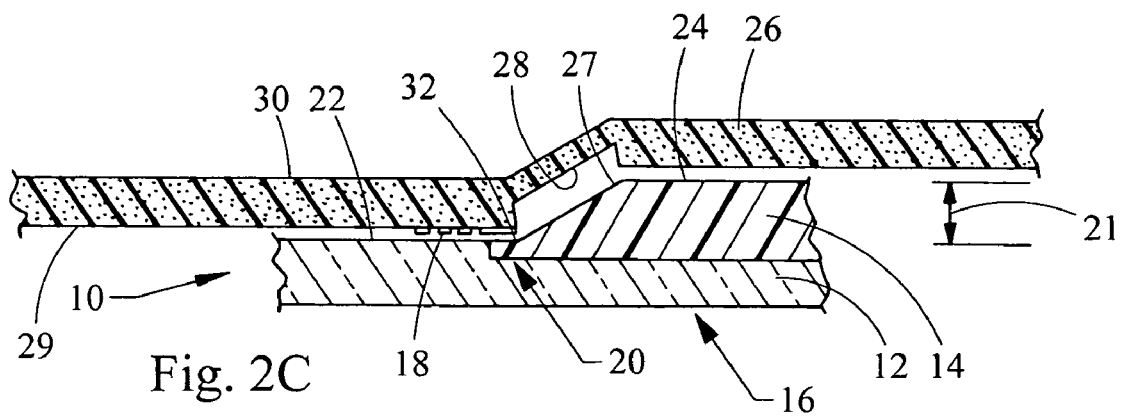
Figure 2D:
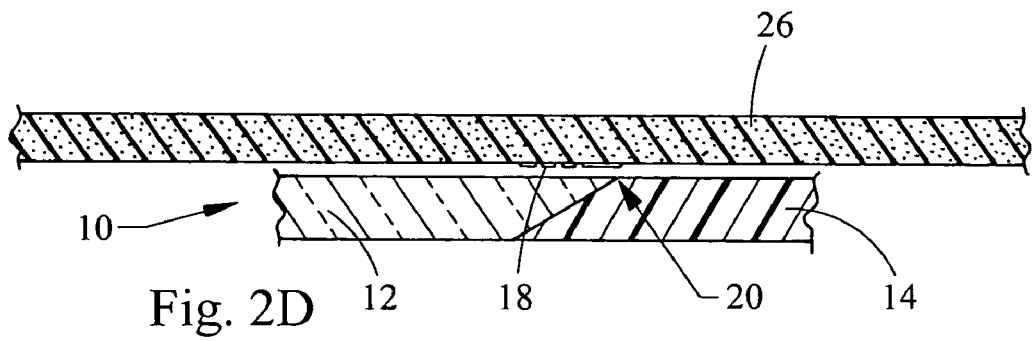

A better approach is seen in FIGS. 2B and 2C. This design modifies the step height 21 at the interfacial area 20 so that the step profile 27 forms an angle with the plane of the surface 22 that is generally between 60 and 30 degrees, and preferably about 45 degrees. While illustrated with the step profile 27 being formed and defined solely from by the second shot of the frame portion 14, alternatively the step profile in such a geometry could be partially defined by the second shot and frame portion 14 and partially by the first shot and panel 12. The best geometry for the interface between the first and second shots, in order to print an image 18, is a "flush" interfacial area 20 between the panel 12 and frame portion 14, as shown in FIG. 2D. However, this latter configuration is not the best with regard to molding design due to the limited overlap between the panel 12 and frame portion 14. This lack of overlap may not insure adequate melt bonding and adhesion between the panel 12 and frame portion 14.

As noted previously, an additional way in which the "picture framing" and "window effect" may be "eliminated" is to hide these defects by applying a printed image 18 in this area. The "picture framing" distortion line would be hidden within the opaqueness of the printed fade-out border 18 and, thus, the distortion line would be eliminated from observation by a normal observer.

According to the present invention, the image 18 is printed on the transparent panel 12 of a two component window assembly 10 using a variation on MIT printing. MIT printing in general offers the ability to print articles with complex shape with the print resolution and opacity normally obtained by screen-printing on flat substrates. In this process, a printed decoration is applied through a screen to a flat "soft" membrane via the use of conventional screen-printing. The membrane is then deformed or shaped to the geometry of the surface of the substrate through the use of a form fixture resembling the complementary shape of the substrate. The shaped membrane and the substrate are then held in a part fixture and pressed together in forced contact. The application of pressure between the substrate and the formed membrane results in the transfer of the screen-printed image from the membrane to the substrate.

Figure 3A:
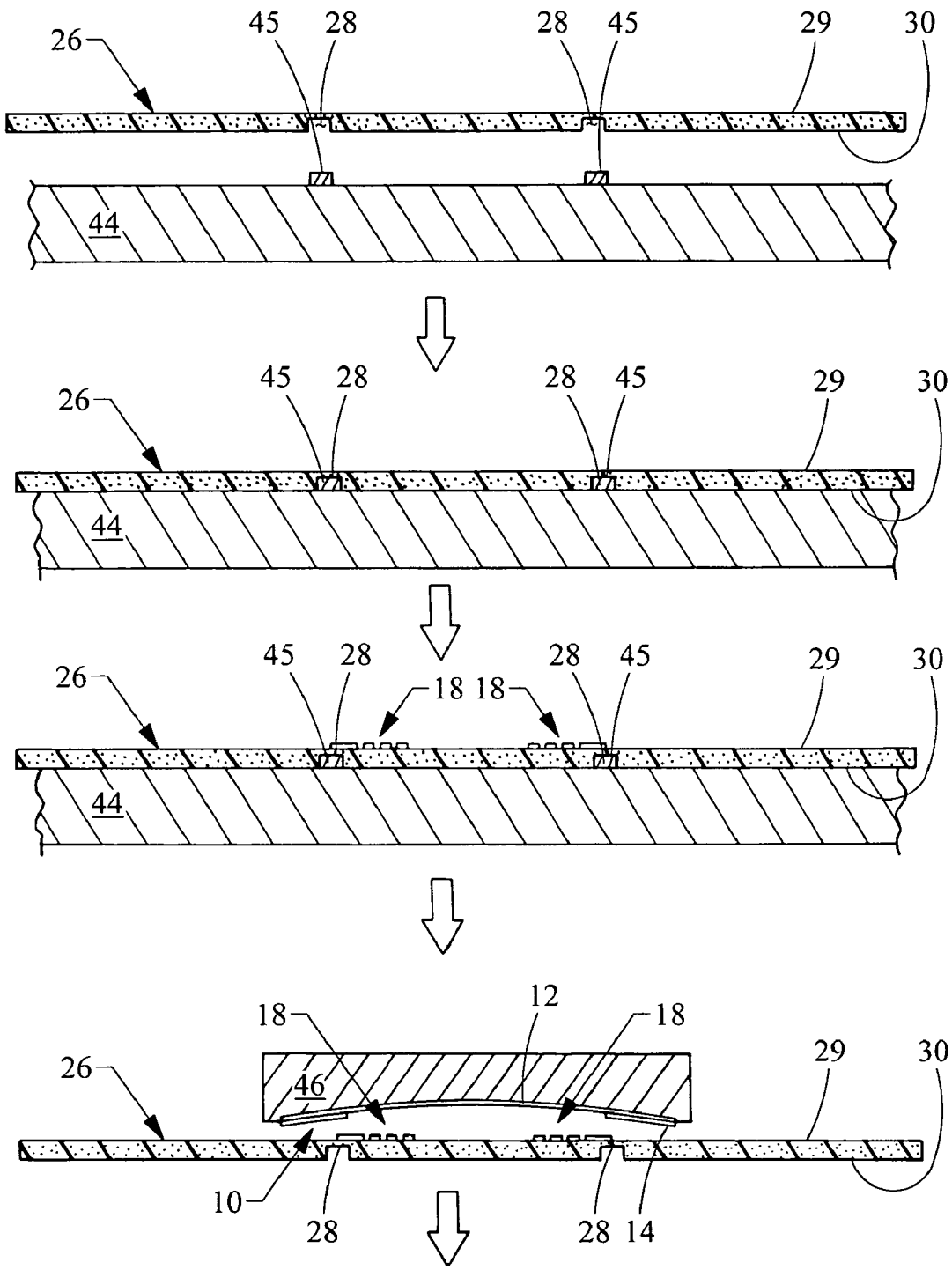
FIGS. 3A and 3B schematically illustrate a method by which an image is transferred from a membrane to a two component window assembly embodying the principles of the present invention.
Figure 3B:
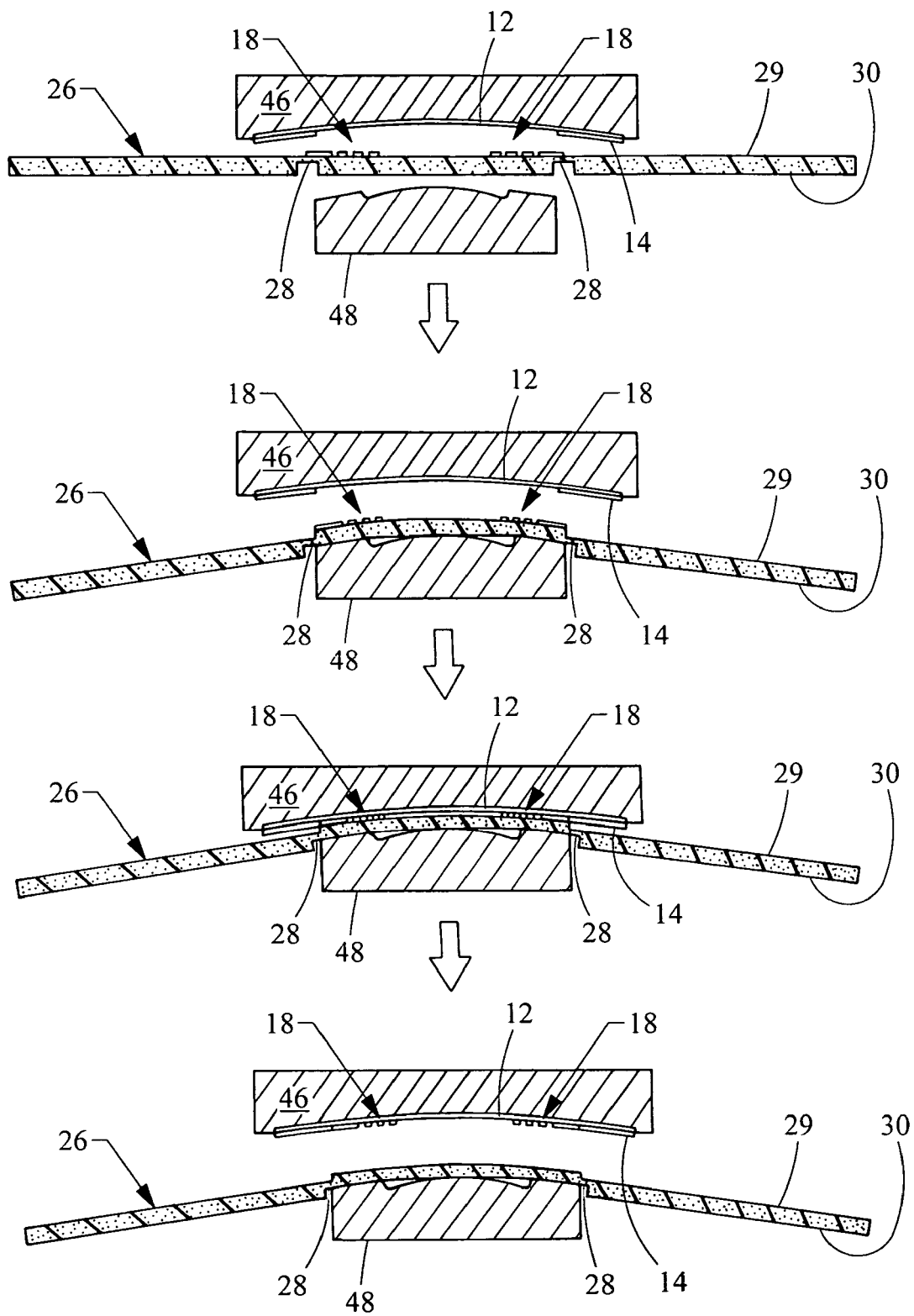

The application of printed black-out/fade-out pattern to a plastic panel using the MIT process embodying the principles of the present invention is depicted in FIGS. 3A and 3B. In this particular example, a groove 28 is formed or cut into the membrane to allow shaping of the membrane 26 to move precisely following the step profile 27 between the surface 22 of the panel 12 and the surface 24 of the frame portion 14 of the window assembly 10. The groove 28 may be formed in either the surface 29 of the membrane 18 carrying the image (the image transfer surface) or the opposing surface 30 of the membrane 26, the latter being referred to herein as a "reverse" groove. The In FIGS. 3A and 3B, the membrane is provided with a reverse groove 28. The groove 28 extends in a closed loop or on the membrane 18. This shape corresponding to the shape defined by the interfacial area 20 as that area extends about an effective viewing area of the panel 12. Provided the image 18 is printed to the membrane 26 immediately inward of the groove 28, it is believed that the inward most edge of the groove 28 should correspond in shape precisely with the transition line 32 defined between the plane of the surface 22 of the panel 12 and the rise of the step profile 27 of frame portion 14.

The membrane 26 is typically a low surface energy polymer, such as extruded silicone. The inventors have found that a membrane of about ⅛"-¼" and 60-85 durometer Shore A is satisfactory, with the higher durometer membranes being preferred. It is noted that only the image area needs to be constructed out of this material in order to transfer an image.

Figure 4:
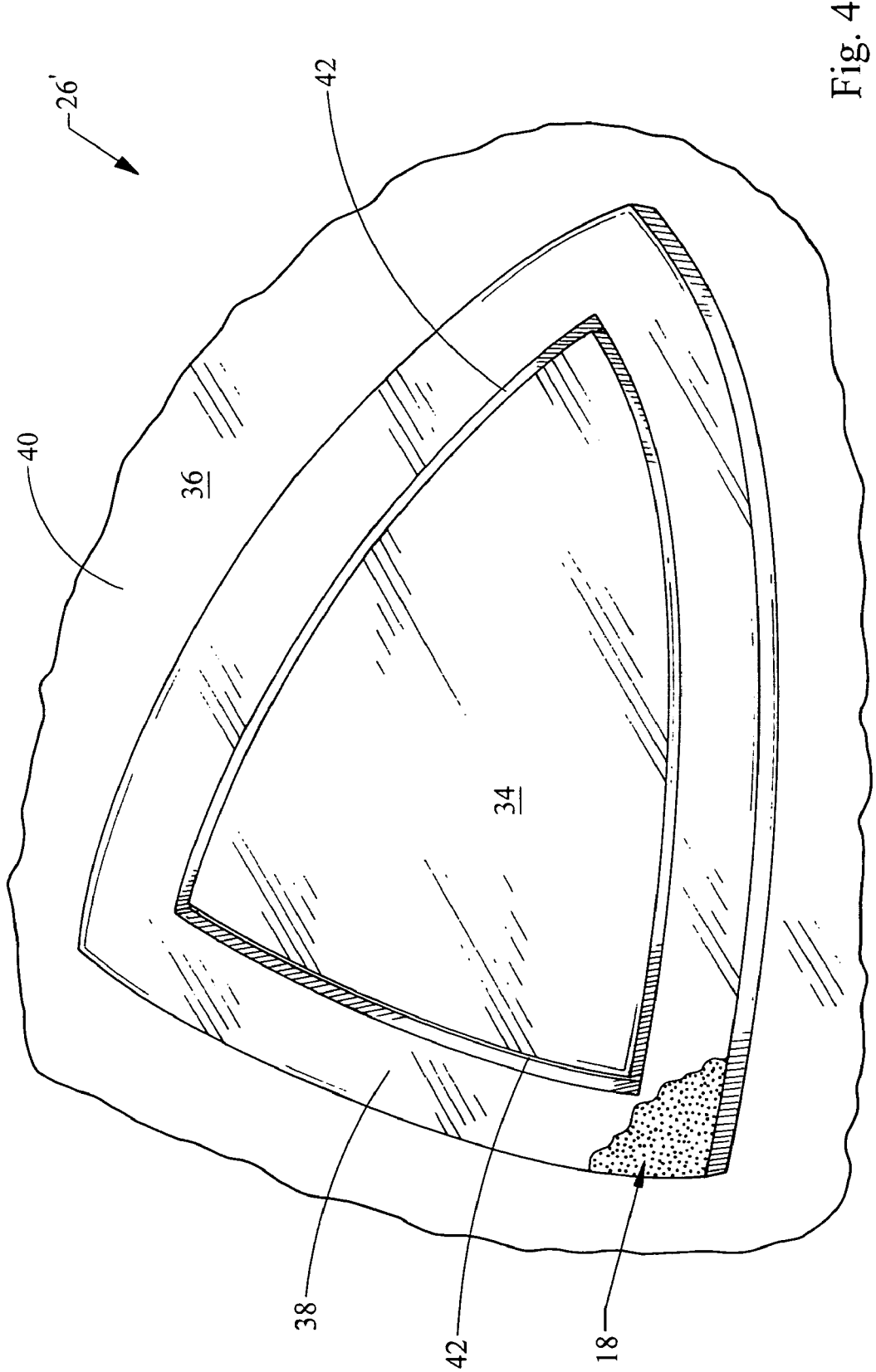
FIG. 4 is a partial perspective view of an alternative embodiment of a membrane embodying the principles of the of the present invention and illustrating a membrane having an elevated image transfer surface.

As an alternative embodiment, shown in FIG. 4, the membrane 26' may be formed as an image transfer pad 34 (of the same material previously mentioned for the membrane 26) provided on top of a carrier sheet or layer 36, which may made of a less expensive and/or more resilient material. The purpose of this carrier layer 36 is to carry or support the transfer pad 34 during the MIT process. The carrier layer 36 may be a flexible plastic film, a polyester or a polyamide mesh fabric, among other options. The transfer pad 34 would be attached to the carrier layer by being stitched, the use of an adhesive or other means.

The transfer pad 34 defines an image transfer surface 38 that is elevated or raised relative to the surface 40 of the carrier layer 36. As in the prior embodiment, formed in the transfer surface 38 is a recessed groove 42. The location of the groove 42 may be removed from the image area and the may be provided to provide a recessed surface for stitching and securing the pad 34 to the carrier layer 36.

Referring back to FIGS. 3A and 3B, in order to print the image 18 onto the membrane 26, the membrane 26 is moved to a printing station. At the printing station, the membrane 26 is brought into engagement with a printer table 44. Where the membrane 26 includes a reverse groove 28, the table 44 may be provided with a template 45 for registering the membrane 26. With the membrane 26 on the table 44, screen printing or a similar process is performed to apply the image 18 to the image transfer surface 29 of the membrane 26. As shown FIG. 4 and will be appreciated by those skilled in the art, the image 18 is only partially illustrated after being printed on the image transfer surface 38 of the transfer pad 34. Next, the membrane 26 is moved to a transfer station.

At the transfer station, a part fixture 46 holds the window assembly 10 relative to the membrane 26 and the image 18 thereon. A forming fixture 48 is then moved relative to the membrane 26 and shapes the membrane 26. The forming fixture 48 is shaped so as to deform the membrane 26 so as to correspond to the shape of window assembly 10. The forming fixture 46 moves the membrane 26 into contact with the window assembly 10 and pressure is applied to this fixture combination. As a result of this pressure, the image 18 is transferred from the membrane 26 to the window assembly 10 and the forming fixture 48 is thereinafter retracted.

Figure 5:
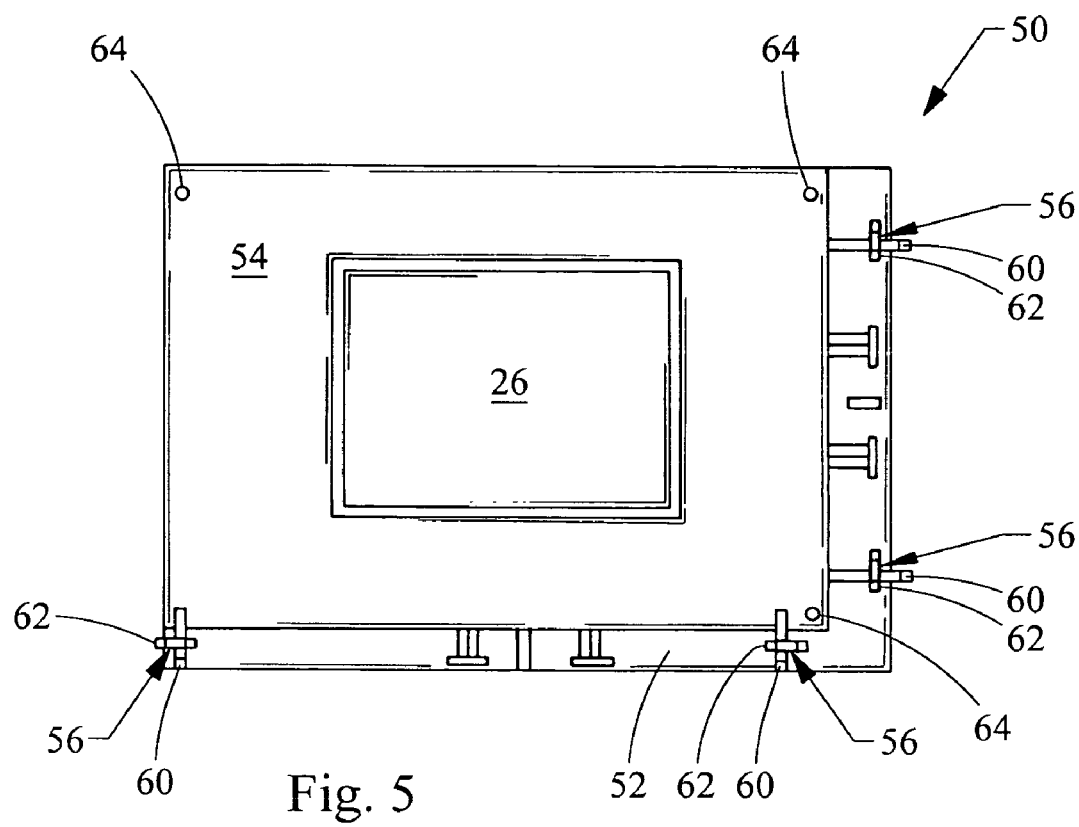
FIGS. 5, 6, and 7A-7C are schematic illustrations of a membrane registration system.
Figure 6:
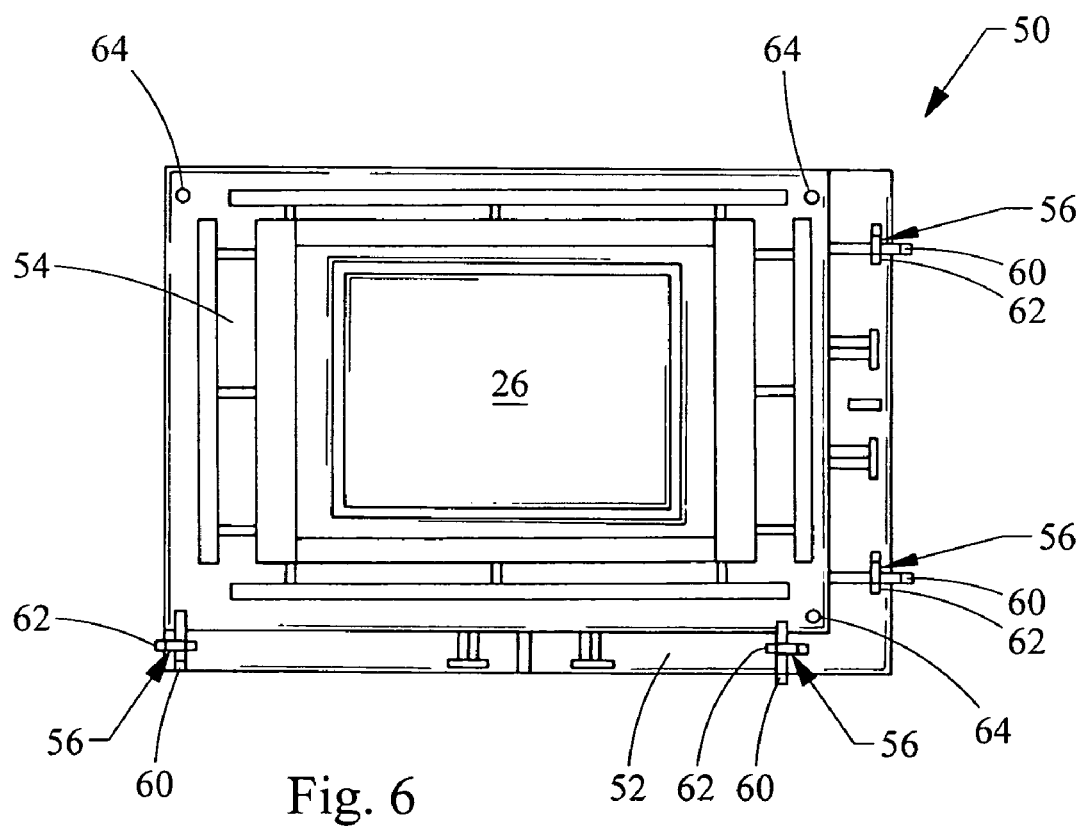
Figure 7A:
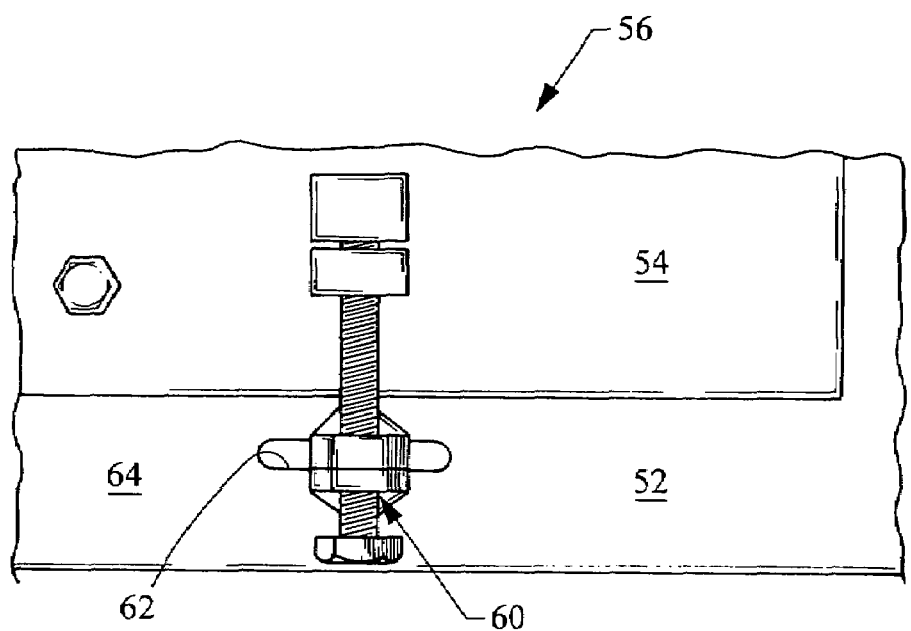
Figure 7B:
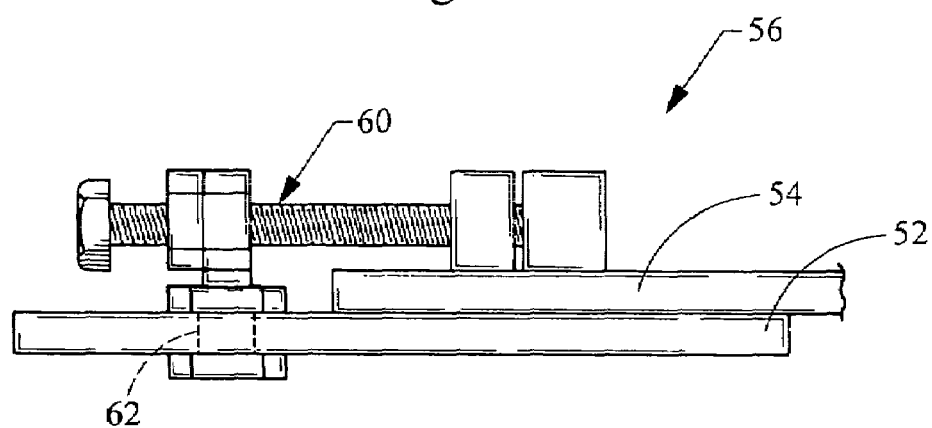
Figure 7C:
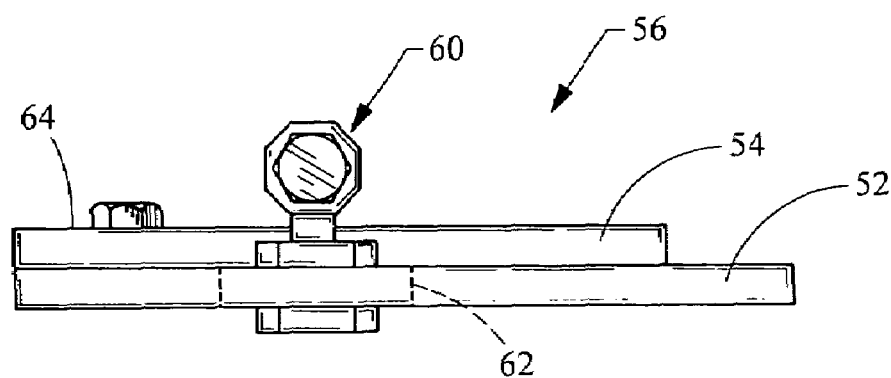

Proper registration must exist between the image applied to the membrane 26 and the window assembly 10 to which the image 18 is to be transferred. One method of accomplishing this task is via membrane registration. In membrane registration, the membrane 26 is positioned on an adjustable sub frame 54 as part of the membrane shuttle between the printing station and the transfer station. An example of the concepts associated with a membrane registration system 50 is illustrated in FIGS. 5-7.

The membrane registration system 50 includes a carrying frame 52 to which is mounted the adjustable sub-frame 54. The sub-frame 54 can be adjusted relative to the carrying frame 52 via a series of adjustment mechanisms 56 connecting the sub-frame 54 to the carrying frame 52. As such the sub-frame 54 and carrying frame 52 form an "x-y" adjustment table. Additional adjustment mechanisms 58, air cylinders and/or mechanical adjusters, are utilized to adjust tension and position the membrane 26 relative to the sub-frame 54. As will be appreciated by those skilled in the art, the adjustment mechanisms 56 may include a combination of conventional set screws with lock nuts 60, and bolt plate assemblies 62 with slots, and lock bolts 64 to secure the registration after making adjustments.

As a person skilled in the art will readily appreciate, the above description is meant as an illustration of implementations of the principles of this invention. This description is not intended to limit the scope or application of this invention in that the invention is susceptible to modification, variation and change, without departing from spirit of this invention, as defined in the following claims.

The invention claimed is:

1. A plastic window assembly comprising:
    a substantially transparent plastic panel, the panel having opposing first and second surfaces and a perimeter region extending around the panel;
    a frame provided around the panel, the frame being formed of plastic and adhered to the second surface at the perimeter region of the panel so as to define an effective viewing area of the panel located within the frame, the frame further having portions defining a raised surface and a transition step extending upward from the second surface of the panel to the raised surface of the frame, the transition step defining an inside perimeter of the frame;
    an interfacial area being defined about a juncture of the transition step and a plane defined by the second surface of the panel; and
    an image provided on the second surface in the effective viewing area of the panel, the image terminating at an outer perimeter thereof located immediately adjacent the inside perimeter of the frame.

2. The plastic window assembly of claim 1 wherein the transition step defines an angle in the range of about 0 to 90 degrees.

3. The plastic window assembly of claim 1 wherein the transition step defines an angle in the range of about 30 to 60 degrees.

4. The plastic window assembly of claim 1 wherein the image is a black out border with fade-out.

5. The plastic window assembly of claim 1 wherein the image is opaque.

6. The plastic window assembly of claim 1 wherein the frame is opaque.

7. The plastic window assembly of claim 1 wherein the frame and the panel are formed of a material selected from the group of polycarbonate and polycarbonate blends.

8. The plastic window assembly of claim 1 wherein the frame includes a lip located in the interfacial area and defining a surface co-planar with the second surface.

9. The plastic window assembly of claim 8 wherein the outer border of the image is located on the lip of the frame.

10. The plastic window assembly of claim 1 further comprising at least one protective layer covering the panel.

11. The plastic window assembly of claim 1 wherein the image is non-transparent and has an outer border positioned immediately adjacent to the interfacial area.

12. The plastic window assembly of claim 1 wherein the image is a black out border with fade-out.

13. The plastic window assembly of claim 1 wherein the transition step is made partially from the panel (a first shot) and partially from the frame portion (a second shot).

* * * * *